(12) United States Patent
Lewinski

(10) Patent No.: US 9,355,541 B1
(45) Date of Patent: May 31, 2016

(54) DUAL-LOOP SMOKE AND FIRE DETECTOR SYSTEM AND METHOD

(71) Applicant: The Boeing Company, Chicago, IL (US)

(72) Inventor: Daniel F. Lewinski, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/639,904

(22) Filed: Mar. 5, 2015

(51) Int. Cl.
  *G08B 19/00* (2006.01)
  *G08B 17/10* (2006.01)
  *B64D 45/00* (2006.01)

(52) U.S. Cl.
  CPC ............... *G08B 17/10* (2013.01); *B64D 45/00* (2013.01); *G08B 19/00* (2013.01); *B64D 2045/009* (2013.01)

(58) Field of Classification Search
  None
  See application file for complete search history.

(56) References Cited

U.S. PATENT DOCUMENTS

| | | | |
|---|---|---|---|
| 6,249,220 B1 * | 6/2001 | Kaji | G08B 5/36 340/506 |
| 6,407,671 B1 * | 6/2002 | Mulvihill | G08B 17/10 340/628 |
| 6,975,237 B2 | 12/2005 | Barton et al. | |
| 7,690,837 B2 | 4/2010 | Ahlers et al. | |
| 8,540,421 B2 | 9/2013 | Ahlers et al. | |
| 2004/0135695 A1 * | 7/2004 | Barton | G08B 25/002 340/628 |
| 2012/0031634 A1 | 2/2012 | Lewinski et al. | |
| 2013/0000927 A1 | 1/2013 | Lewinski et al. | |

* cited by examiner

*Primary Examiner* — Travis Hunnings
(74) *Attorney, Agent, or Firm* — John S. Economou

(57) ABSTRACT

A hazardous condition detection system for an enclosure includes at least three detectors and a controller. Each detector is mounted within the enclosure. Each detector is configured to output a signal representing a first lower level of severity (a pre-alarm threshold) and a signal representing a second higher level of severity (an alarm threshold). The controller monitors the operational status of each of the detectors. In a first mode when all the detectors are operational, the controller generates an alarm signal when at least two detectors output a signal at the alarm threshold level. In a second mode when at least one of the at least three detectors are inoperative and at least two of the at least three detectors are operational, the controller generates an alarm signal when one detector outputs a signal at the alarm threshold level and another detector outputs a signal at the pre-alarm threshold level.

20 Claims, 2 Drawing Sheets

DUAL-LOOP SMOKE AND FIRE DETECTOR SYSTEM AND METHOD

FIELD

The present invention relates generally to smoke and fire detection, and more particularly to systems and methods for detecting smoke and fire in aircraft cargo compartments.

BACKGROUND

Many structures, such as buildings, and systems, such as aircraft, contain some type of smoke or fire detection system that detects smoke or fire, and thereafter provides an indication that a fire may exist within the structure or system. In many structures or systems, such smoke or fire detection systems include a plurality of smoke or fire detectors installed within a particular enclosure. In the context of aircraft, for example, the enclosure is typically a cargo or baggage compartment requiring numerous smoke or fire detectors.

Many regulatory authorities place limits on the amount of smoke allowed to exist in a structure or system before being detected by an appropriate smoke or fire detection system. In the context of aircraft, for example, the Federal Aviation Administration (FAA) has imposed limits on the amount of smoke allowed to exist undetected in many portions of aircraft. In addition, the FAA over time has reduced limits on the amount of time allowed for a smoke or fire detection system to detect a fire in many portions of aircraft.

Conventionally, improving detection performance of smoke or fire detection systems requires increasing the number of smoke or fire detectors, reducing the ventilation in the affected areas of the aircraft and/or increasing the sensitivity of the smoke or fire detectors. And whereas each technique for improving detection performance of smoke or fire detection systems is adequate, each has drawbacks. Increasing the number of fire detectors, for example, increases system costs associated with new detectors, as well as new electrical power sources, wiring, flight deck messages, plumbing complexity, and cargo liner and structural interfaces. Reducing ventilation potentially results in financial losses to the aircraft operator in that to reduce the ventilation, the quantity of some cargo types must typically be reduced, thus reducing the capacity of the affected area and the overall aircraft.

While increasing the sensitivity of the smoke or fire detectors will increase system performance, the number of false alarms initiated by the smoke or fire detectors will also increase. In this regard, the frequency of false alarms is often considered one of the biggest problems with conventional smoke or fire detection systems. Increasing false alarms, in turn, decreases system reliability and can impose considerable costs for the aircraft operator and can result in unnecessary bodily injury to passengers. False alarms can be generated when nuisance sources such as dust, moisture, and/or gasses, are presented to a detector at a level exceeding the alarm threshold. And whenever a fire alarm is triggered on an aircraft, for example, the aircraft crew typically discharge fire extinguishers in the affected area, divert the aircraft to the nearest airport, and occasionally initiate an emergency evacuation of the aircraft. Increased exposure to the number of false alarms results in the airlines incurring costs associated with replacing expended fire extinguishers, accommodating inconvenienced passengers and dispatching the aircraft from an unplanned destination. In addition, unnecessary emergency evacuations can result in unnecessary passenger injuries, which can occur during emergency evacuations.

To address the drawbacks associated with false alarms, conventional smoke or fire detection systems often impose dual-loop operation, requiring at least two detectors (out of the plurality of detectors included within a particular enclosure) to reach full alarm threshold before providing a fire alarm signal. Although this does provides a reduction in the number of false alarms, if any detector among the plurality of detectors fails and becomes inoperative, such systems revert to single-loop operation whereby an alarm signal is provided when a single detector reaches full alarm threshold. In this situation, however, the possibility of false alarms will increase.

Accordingly, there is a need for a smoke or fire detector system which reduces the likelihood of a false alarm even when a single detector fails and becomes inoperative.

SUMMARY

In one aspect, a hazardous condition detection system for an enclosure which includes at least three detectors and a controller. The at least three detectors are for detecting a hazardous condition. Each of the at least three detectors is mounted within the enclosure. Each of the detectors is configured to output a signal representing a first level of severity of the hazardous condition and a signal representing a second level of severity of the hazardous condition. The first level of severity is less than the second level of severity. The first level of severity corresponds to a pre-alarm threshold and the second level of severity corresponds to an alarm threshold. The controller is coupled to receive the signals from each of the at least three detectors. The controller is configured to monitor an operational status of each of the at least three detectors. The controller is configured to operate in a first mode when all of the at least three detectors are operational and, in the first mode, to generate an alarm signal when at least two of the at least three detectors output a signal at the alarm threshold level. The controller is configured to operate in a second mode when at least one of the at least three detectors is inoperative and at least two of the at least three detectors are operational and, in the second mode, to generate an alarm signal when one of the at least three detectors outputs a signal at the alarm threshold level and another of the at least three detectors outputs a signal at the pre-alarm threshold level.

In one further embodiment, the hazardous condition is a fire and each of the at least three detectors is a smoke detector. In a second further embodiment, the hazardous condition is a fire and each of the at least three detectors is a fire detector. In a third further embodiment, the hazardous condition is a fire and each of the at least three detectors is a combined smoke and fire detector. In a fourth further embodiment, the hazardous condition is a fire and at least one of the at least three detectors is a smoke detector. In a fifth further embodiment, the hazardous condition is a fire and at least one of the at least three detectors is a fire detector. In a sixth further embodiment, the hazardous condition is a fire and at least one of the at least three detectors is a combined smoke and fire detector.

In one alternative further embodiment, each of the detectors may include a built in test diagnostic function for determining the operational status thereof and the controller may be configured to monitor the operational status of each of the at least three detectors automatically by communicating with each of the at least three detectors via a communication link that couples each of the at least three detectors to the controller. In another alternative further embodiment, each of the detectors may includes a manual switch for determining the operational status thereof and the controller may be configured to monitor the operational status of each of the at least three detectors by monitoring status information entered via a user interface.

In a second aspect, a controller for a hazardous condition detection system for an enclosure. The controller is coupled to receive the signals from each of at least three detectors for detecting the hazardous condition mounted within the disclosure. The controller is configured to monitor an operational status of each of the at least three detectors. The controller is configured to operate in a first mode when all of the at least three detectors are operational and, in the first mode, to generate an alarm signal when at least two of the at least three detectors output a signal at an alarm threshold level. The alarm threshold corresponds to a second level of severity of the hazardous condition. The controller is configured to operate in a second mode when at least one of the at least three detectors is inoperative and at least two of the at least three detectors are operational and, in the second mode, to generate an alarm signal when one of the at least three detectors outputs a signal at the alarm threshold level and another of the at least three detectors outputs a signal at the pre-alarm threshold level. The pre-alarm threshold corresponds to a first level of severity of the hazardous condition. The first level of severity is less than the second level of severity.

In a third aspect, a method for detecting a hazardous condition within an enclosure. The operational and signal status of at least three detectors for detecting a hazardous condition is monitored. Each of the at least three detectors is mounted within the enclosure. Each of the detectors is configured to output a signal representing a first level of severity of the hazardous condition and a signal representing a second level of severity of the hazardous condition. The first level of severity is less than the second level of severity. The first level of severity corresponds to a pre-alarm threshold and the second level of severity corresponds to an alarm threshold. When all of the at least three detectors are operational, an alarm signal is generated when at least two of the at least three detectors output a signal at the alarm threshold level. When at least one of the at least three detectors is inoperative and at least two of the at least three detectors are operational, an alarm signal is generated when one of the at least three detectors outputs a signal at the alarm threshold level and another of the at least three detectors outputs a signal at the pre-alarm threshold level. In a further embodiment, the operational status of each of the at least three detectors is monitored automatically by communicating with each of the at least three detectors via a communications link.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure. The present disclosure describes a system for detecting a hazardous condition such as smoke and/or fire in an enclosure, based upon the use of smoke detectors, fire (heat) detectors, and/or combined smoke and fire detectors. For the purposes of this disclosure, the phrase "fire detection system" refers to a system for detecting smoke only (i.e., including only smoke detectors), fire (heat) only (i.e., including only fire detectors), or smoke and fire (i.e., including smoke and fire detectors).

Figure 1:
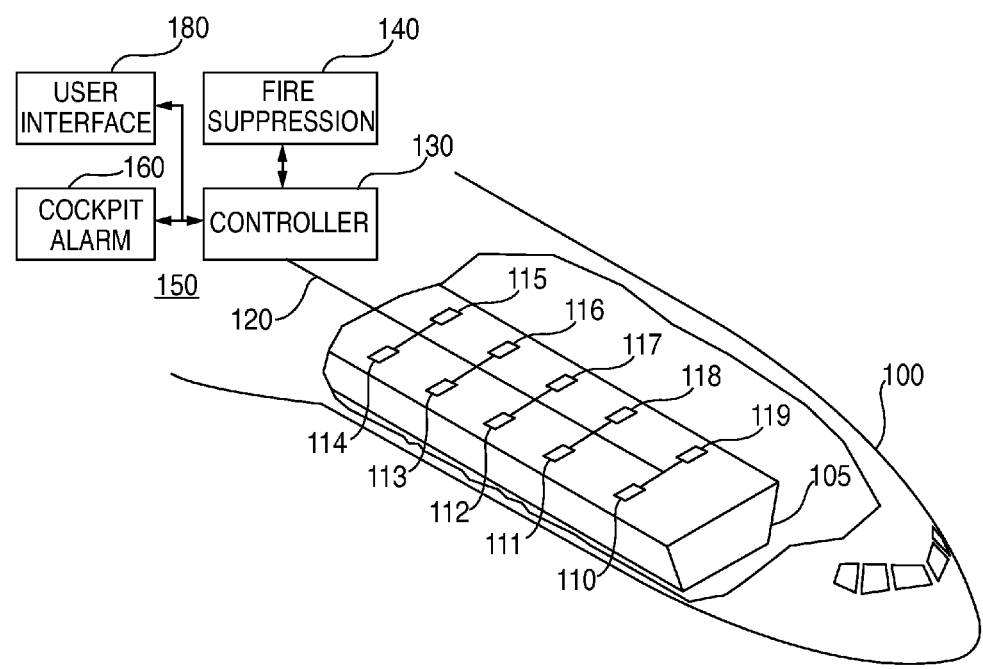
FIG. 1 is a diagram of a fire protection alarm system in an aircraft according to the present disclosure.

Referring now to FIG. 1, a fire detection system 150 is provided for detecting a hazardous condition within an enclosure 105 in an aircraft 100. Enclosure 105 may comprise a baggage or cargo compartment, a crew rest area, or a lavatory, for example. Although FIG. 1 shows system 150 installed in an aircraft, as one of skill in the art will readily recognize, the system disclosed herein is not limited to aircraft applications and can be used in any application requiring three or more detectors (as discussed below). System 150 includes a plurality of fire or smoke detectors 110-119 which are each coupled to a controller 130 via a communications interface 120. Controller 130 may be coupled to a fire suppression system 140 and to a cockpit alarm display 160. The number of detectors 110-119 depends on the size of enclosure 105, and, although ten detectors 110-119 are shown in FIG. 1, the system of the present disclosure may be used in any enclosure requiring three or more detectors. Communications interface 120 is conventional and may be any type of communications link, and preferably one which provides two-way communications.

Detectors 110-119 may each be a smoke detector (e.g., which detects particulates or gasses in the air in enclosure 105), a fire detector (e.g., which detects undesirably high temperatures in enclosure 105) or a combination of a smoke and fire detectors (i.e., a combined smoke and fire detector). Further, each of the detectors 110-119 is capable of detecting at least two levels or values of a predefined parameter representing the severity of the hazardous condition (i.e., smoke or fire), a first lower level is associated with a pre-alarm threshold and a second higher level associated with an alarm threshold. As one of ordinary skill in the art will readily recognize, each pre-alarm threshold can be set at any value lower than the alarm threshold but, in one preferred embodiment, the pre-alarm threshold is set at a value between a quiescent or background level of the respective parameter and the alarm threshold. For example, when the alarm threshold for a smoke detector is set at 9% per foot obscuration and the quiescent concentration of smoke is defined as 0% per foot obscuration, the pre-alarm threshold for detecting smoke can be set at 6% per foot obscuration.

To reduce the likelihood of false alarms, during normal operation, controller 130 monitors the outputs from each of the detectors 110-119 (i.e., the signal status) and determines that a fire alarm signal should be output only when two or more of the detectors 110-119 provide signals above the alarm threshold level. Controller may also be coupled to a user interface 180 for use in configuring system 150 and for optionally entering detector status information. Upon such determination, controller 130 may, for example, activate fire suppression system 140 and provide a cockpit alarm 160 (e.g., via a display and/or an audible alarm signal). As discussed above, normal operation is defined as the situation where each detector 110-119 operates normally. However, when the operational status of one of the detectors 110-119 is found to be in a failure state (e.g., via a signal sent via communication link 120 in response to a built-in test failure, via the failure of a detector to respond to a query from controller 130 or via a manual test performed at the detector and thereafter entered into a memory in controller 130 using user interface 180), controller 130 instead determines that a fire alarm signal should be output only when one of the detectors 110-119 provide a signal above the alarm threshold level and when another of the detectors 110-119 provides a signal above the pre-alarm threshold. Conventional systems, as discussed above, provide a fire alarm signal when only a single detector provides an output above the alarm threshold after a detector has failed—which can result in additional false alarms since the fire alarm signal is triggered based only upon the signal from a single detector. System 150 of the present disclosure provides additional protection from false alarms by only providing a fire alarm signal, after the identification of a failed detector, when one detector provides a signal above the alarm threshold and when another separate detector provides a signal above a lower pre-alarm threshold. As evident, such a system requires at least three detectors, given that two detectors are needed to provide alarm signals (one at alarm threshold and the other at pre-alarm threshold), and the third detector corresponds to a failed detector. Normally, however, such systems are normally used in enclosures requiring many more than three detectors.

Figure 2:
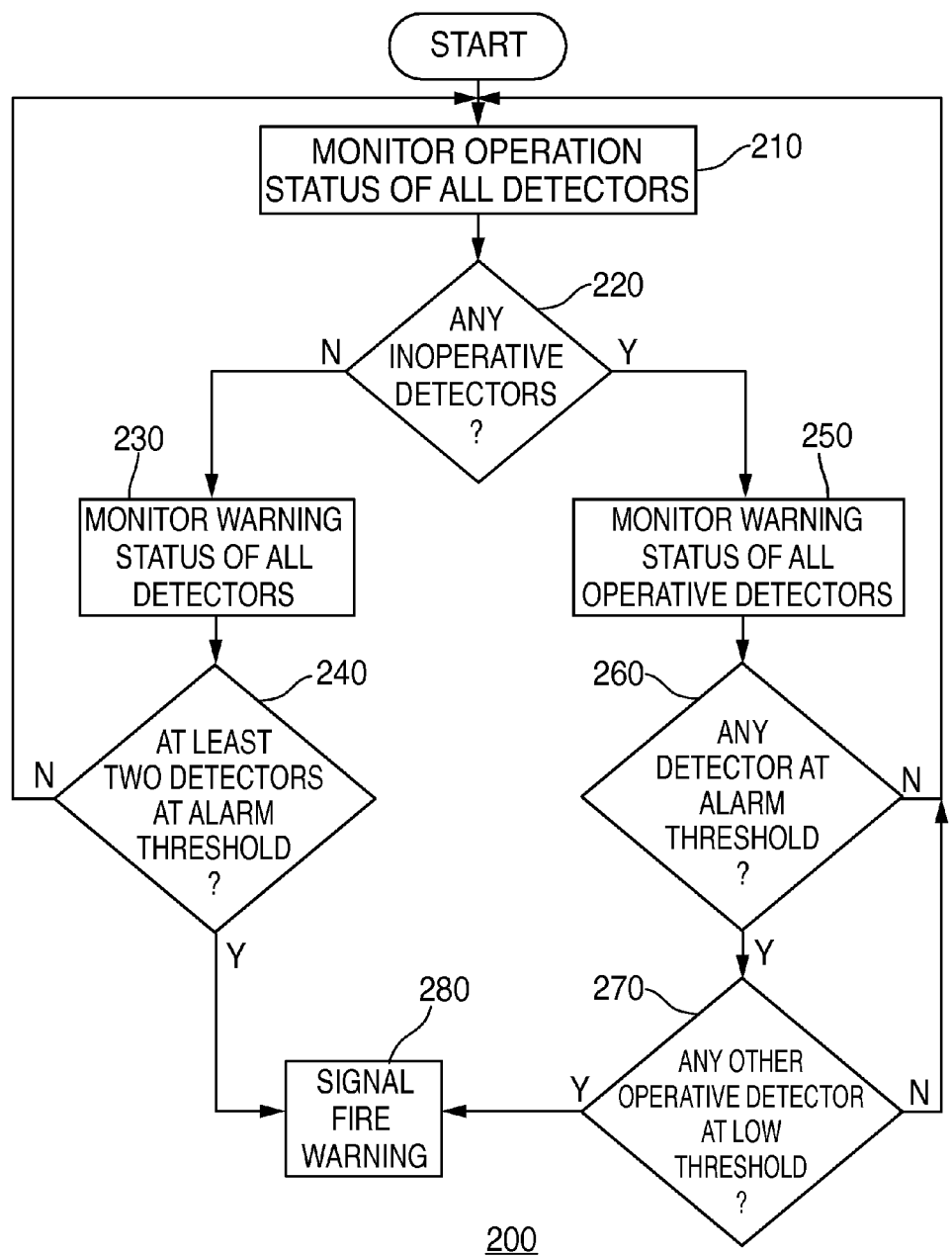
FIG. 2 is a flowchart showing the operation of the fire protection alarm system of the present disclosure.

Referring now to FIG. 2, a flowchart 200 is shown for the operation of controller 130 in FIG. 1. The first step 210 requires that the operational status of each of the detectors 110-119 be monitored to determine if any have failed and thus become inoperative. This can be done in many ways. Preferably, each detector includes built in test capability, so that an internal diagnostic system runs checks periodically and, in the event of failure, the detector sends a signal to controller 130 indicating that such detector has become inoperative. In addition, controller 130 may be capable of communicating separately with each detector, e.g., based upon a particular address, and, in the event that no response is received from a query sent to a particular address, the detector associated with that address is set as inoperative. Further, each detector may include the capability to be manually tested (e.g., via a "test" button or touchscreen display) to ensure that the detector is operable. If a manual test is employed, controller 130 may be accessed via user interface 180 to record the results of such test, and particularly, to enter status at least when an inoperative detector is found. At step 220, a determination is made whether an inoperative detector has been identified (i.e., the operational status is checked or reviewed).

If no inoperative detector is identified at step 220, processing proceeds to step 230 (the normal operation pathway), where the warning (or signal) status (i.e., the detector output signals) is monitored. At step 240, a determination is made whether the warning status of two (or more) detectors has reached the alarm threshold level. If the determination is negative at this point (i.e., either that only one detector has reached alarm threshold or that no detector has reached alarm threshold), processing returns to step 210. If the determination is positive and two (or more) detectors have reached alarm threshold, processing proceeds to step 280 where a fire alarm warning signal is provided. As discussed above, this may be via a visible display and/or an audible alarm, for example, and may also involve the activation of a fire suppression system.

If an inoperative detector is identified at step 220, processing instead proceeds to step 250 (the failed detector pathway), where the warning status (i.e., the detector output signals) are monitored. At step 260, a determination is made whether the warning status of any single operative detector has reached alarm threshold. If not, processing reverts to step 210. If the determination at step 260 is positive, however, processing proceeds to step 270, where a determination is made whether the warning status of any other operative detector has reached at least pre-alarm threshold. If not, processing again reverts to step 210. When the determination at step 270 is positive and the warning status of a second separate detector has reached the pre-alarm threshold, processing proceeds to step 280 to provide a fire alarm signal warning. In this manner, the alarm signal is based on more than a single detector, ensuring a higher likelihood that the determination of a fire alarm is not a false alarm but still is based on a lower threshold than normal operation, ensuring that consideration is given that one of the detectors in the enclosure being monitored is inoperative.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A hazardous condition detection system for an enclosure, comprising:
   at least three detectors for detecting a hazardous condition, each of the at least three detectors mounted within the enclosure, each of the detectors configured to output a signal representing a first level of severity of the hazardous condition and a signal representing a second level of severity of the hazardous condition, the first level of severity less than the second level of severity, the first level of severity corresponding to a pre-alarm threshold and the second level of severity corresponding to an alarm threshold; and
   a controller coupled to receive the signals from each of the at least three detectors, the controller configured to monitor an operational status of each of the at least three detectors, the controller configured to operate in a first mode when all of the at least three detectors are operational and, in the first mode, to generate an alarm signal when at least two of the at least three detectors output a signal at the alarm threshold level, the controller configured to operate in a second mode when at least one of the at least three detectors is inoperative and at least two of the at least three detectors are operational and, in the second mode, to generate an alarm signal when one of the at least three detectors outputs a signal at the alarm threshold level and another of the at least three detectors outputs a signal at the pre-alarm threshold level.

2. The hazardous condition detection system of claim 1, wherein the hazardous condition is a fire and wherein each of the at least three detectors is a smoke detector.

3. The hazardous condition detection system of claim 1, wherein the hazardous condition is a fire and wherein each of the at least three detectors is a fire detector.

4. The hazardous condition detection system of claim 1, wherein the hazardous condition is a fire and wherein each of the at least three detectors is a combined smoke and fire detector.

5. The hazardous condition detection system of claim 1, wherein the hazardous condition is a fire and wherein at least one of the at least three detectors is a smoke detector.

6. The hazardous condition detection system of claim 1, wherein the hazardous condition is a fire and wherein at least one of the at least three detectors is a fire detector.

7. The hazardous condition detection system of claim 1, wherein the hazardous condition is a fire and wherein at least one of the at least three detectors is a combined smoke and fire detector.

8. The hazardous condition detection system of claim 1, wherein each of the detectors includes a built in test diagnostic function for determining the operational status thereof, and wherein the controller is configured to monitor the operational status of each of the at least three detectors automatically by communicating with each of the at least three detectors via a communication link that couples each of the at least three detectors to the controller.

9. The hazardous condition detection system of claim 1, wherein each of the detectors includes a manual switch for determining the operational status thereof, and wherein the controller is configured to monitor the operational status of each of the at least three detectors by monitoring status information entered via a user interface.

10. A controller for a hazardous condition detection system for an enclosure, the controller coupled to receive the signals from each of at least three detectors for detecting the hazardous condition mounted within the disclosure, the controller configured to monitor an operational status of each of the at least three detectors, the controller configured to operate in a first mode when all of the at least three detectors are operational and, in the first mode, to generate an alarm signal when at least two of the at least three detectors output a signal at an alarm threshold level, the alarm threshold corresponding to a second level of severity of the hazardous condition, the controller configured to operate in a second mode when at least one of the at least three detectors is inoperative and at least two of the at least three detectors are operational and, in the second mode, to generate an alarm signal when one of the at least three detectors outputs a signal at the alarm threshold level and another of the at least three detectors outputs a signal at the pre-alarm threshold level, the pre-alarm threshold corresponding to a first level of severity of the hazardous condition, the first level of severity less than the second level of severity.

11. The controller of claim 10, wherein the hazardous condition is a fire and wherein each of the at least three detectors is a smoke detector.

12. The controller of claim 10, wherein the hazardous condition is a fire and wherein each of the at least three detectors is a fire detector.

13. The controller of claim 10, wherein the hazardous condition is a fire and wherein each of the at least three detectors is a combined smoke and fire detector.

14. The controller of claim 10, wherein the hazardous condition is a fire and wherein at least one of the at least three detectors is a smoke detector.

15. The controller of claim 10, wherein the hazardous condition is a fire and wherein at least one of the at least three detectors is a fire detector.

16. The controller of claim 10, wherein the hazardous condition is a fire and wherein at least one of the at least three detectors is a combined smoke and fire detector.

17. The controller of claim 10, wherein each of the detectors includes a built in test diagnostic function for determining the operational status thereof, and wherein the controller is configured to monitor the operational status of each of the at least three detectors automatically by communicating with each of the at least three detectors via a communication link that couples each of the at least three detectors to the controller.

18. The controller of claim 10 wherein each of the detectors includes a manual switch for determining the operational status thereof, and wherein the controller is configured to monitor the operational status of each of the at least three detectors by monitoring status information entered via a user interface.

19. A method for detecting a hazardous condition within an enclosure, comprising the steps of:

monitoring the operational and signal status of at least three detectors for detecting a hazardous condition, each of the at least three detectors mounted within the enclosure, each of the detectors configured to output a signal representing a first level of severity of the hazardous condition and a signal representing a second level of severity of the hazardous condition, the first level of severity less than the second level of severity, the first level of severity corresponding to a pre-alarm threshold and the second level of severity corresponding to an alarm threshold;

when all of the at least three detectors are operational, generating an alarm signal when at least two of the at least three detectors output a signal at the alarm threshold level; and when at least one of the at least three detectors is inoperative and at least two of the at least three detectors are operational, generating an alarm signal when one of the at least three detectors outputs a signal at the alarm threshold level and another of the at least three detectors outputs a signal at the pre-alarm threshold level.

20. The method of claim 19, wherein the operational status of each of the at least three detectors is monitored automatically by communicating with each of the at least three detectors via a communications link.

* * * * *